(12) United States Patent
Katano et al.

(10) Patent No.: US 7,803,231 B2
(45) Date of Patent: Sep. 28, 2010

(54) SUBSTRATE EDGE PART CLEANING APPARATUS AND SUBSTRATE EDGE PART CLEANING METHOD

(75) Inventors: Ryouichirou Katano, Osaka (JP); Shinjiro Tsuji, Nara (JP)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 11/632,150

(22) PCT Filed: Aug. 1, 2005

(86) PCT No.: PCT/JP2005/014479
§ 371 (c)(1),
(2), (4) Date: Jan. 11, 2007

(87) PCT Pub. No.: WO2006/027919
PCT Pub. Date: Mar. 16, 2006

(65) Prior Publication Data
US 2007/0181152 A1 Aug. 9, 2007

(30) Foreign Application Priority Data
Sep. 3, 2004 (JP) .............................. 2004-257553

(51) Int. Cl.
*B08B 7/00* (2006.01)
(52) U.S. Cl. ............................... 134/6; 134/18; 134/42; 15/77; 15/97.1; 15/102
(58) Field of Classification Search ...................... 134/6, 134/18, 41, 42; 15/77, 97.1, 102
See application file for complete search history.

(56) References Cited

U.S. PATENT DOCUMENTS 5,831,247 A 11/1998 Hidaka
5,982,474 A * 11/1999 Akiyama et al. .............. 355/53

FOREIGN PATENT DOCUMENTS

EP 0 956 952 11/1999

(Continued)

OTHER PUBLICATIONS

English translation of paragraphs [0032]-[0080] and Figs. 3 and 7 of JP 09-153526, published Jun. 10, 1997.

(Continued)

*Primary Examiner*—Michael Barr
*Assistant Examiner*—Saeed T Chaudhry
(74) *Attorney, Agent, or Firm*—Wenderoth, Lind & Ponack, L.L.P.

(57) ABSTRACT

A substrate edge part cleaning apparatus judging a cleaning degree of glass substrates when cleaning edge parts of the glass substrates used for liquid crystal display. The substrate edge part cleaning apparatus 100 having a cleaning head wiping an edge part of a substrate for display A while moving rectilinearly, and having a camera 117 capturing images of the proximity of an edge of a color filter which is placed on the substrate, by moving together with the cleaning head. The camera 117 obtains surface status information of the substrate part which has been cleaned, and the substrate edge part cleaning apparatus 100 further includes a cleaning degree judgment unit 306 judging a cleaning degree based on the surface status information.

2 Claims, 9 Drawing Sheets

FOREIGN PATENT DOCUMENTS

| | | |
|---|---|---|
| JP | 7-263394 | 10/1995 |
| JP | 9-153526 | 6/1997 |
| JP | 9-265105 | 10/1997 |
| JP | 10-135106 | * 5/1998 |
| JP | 11-095242 | 4/1999 |
| JP | 2003-266032 | 9/2003 |
| JP | 2004-039730 | * 2/2004 |

OTHER PUBLICATIONS

English translation of paragraphs [0043]-[0062] and Fig. 2 of JP 2004-039730, published Feb. 5, 2004.

* cited by examiner

SUBSTRATE EDGE PART CLEANING APPARATUS AND SUBSTRATE EDGE PART CLEANING METHOD

BACKGROUND OF THE INVENTION

1. Field of Invention

The present invention relates to a cleaning apparatus and the like that cleans a substrate for liquid crystal display, especially to a substrate edge part cleaning apparatus and the like that cleans an edge part of a substrate by wiping with a cloth.

2. Description of the Related Art

Recently, liquid crystal displays have become widespread as a monitor for a computer and as a television screen, and the number of demands for such liquid crystal displays has been on the rapid increase. Under the circumstances like this, there are also strong demands for the quality improvement and the better price of liquid crystal displays. Therefore, it is a very important task to improve mounting quality and a yield in the process of mounting electrical components on a substrate for liquid crystal display.

With a view to improve mounting quality and the like, a terminal setting area of a substrate is cleaned before electrical components are mounted on the substrate for liquid crystal display in order to improve mounting quality and the like. In this way, bad connections of such electrical components and the like are improved.

As for cleaning an edge part of a substrate for liquid crystal display, automatic cleaning apparatuses have been developed that clean such an edge part by wiping the edge part on which terminals are placed with a cloth containing cleaning liquid and the like. In addition, such apparatuses have been proposed as inventions (for example, refer to Reference Document 1: U.S. Pat. No. 3,445,709.)

Such an automatic cleaning apparatus for liquid crystal display is highly efficient in cleaning and is also highly contributed to the improvement in mounting quality. However, the circumstances surrounding such an apparatus are changing. In other words, it is becoming insufficient to meet the performance requirements for recent substrates for liquid crystal displays.

The first reason is that there is a problem that will be described below. Since the mounting density of electrical components is becoming higher, it is required to maintain high cleaning degree of the substrate surface. Nevertheless, insufficient cleaning operations will be performed in due course. This is because cleaning degrees are evaluated according to only an empirical rule although cleaning degree of the substrate surface decreases to a value below the standard value while cleaning operations are repeated over a long time span. As a result, the yield of the end-product deteriorates.

The present invention is conceived in order to solve the above-described problem. A first object of the present invention is to provide a substrate edge part cleaning apparatus that can evaluate cleaning degrees of an edge part of a substrate and a cleaning method performed by the substrate edge part cleaning apparatus.

The second reason is that there is a problem that will be described below. It is required to narrow, as much as possible, the edge part (frame) of a liquid crystal display because no image is displayed there. However, a conventional cleaning apparatus cannot clean such a narrow frame with a sufficient accuracy of position.

Figure 1:
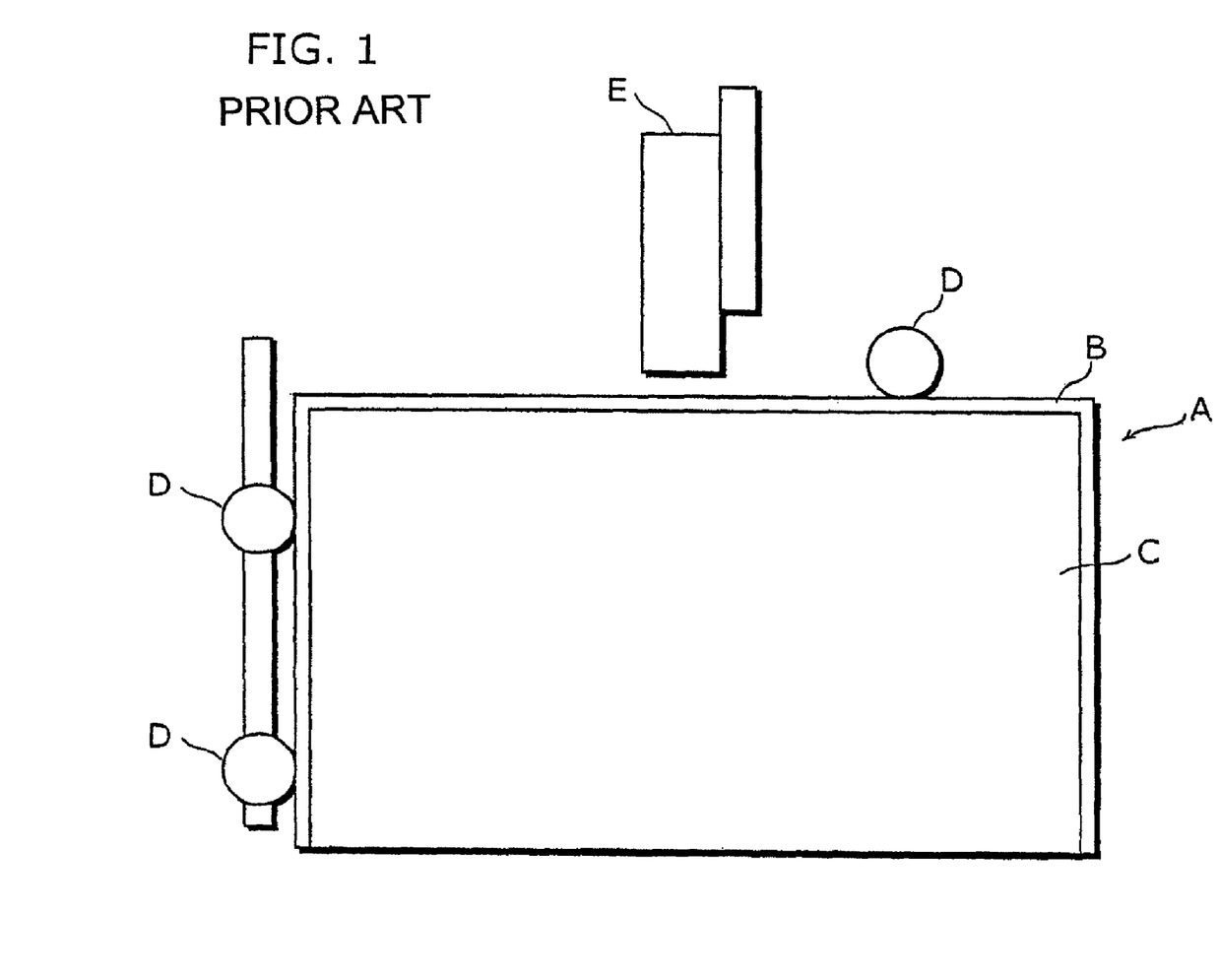
FIG. 1 is a plane view showing the positional determination concerning a conventional substrate for liquid crystal display.

Here, as shown in FIG. 1, a substrate for liquid crystal display includes: a glass substrate B having a frame on which electrical components are mounted; and a color filter C that is a little smaller than the glass substrate B.

Also, in order to narrow such a frame, it is required that the glass substrate B be made smaller as much as possible and electrical components be mounted closer to the color filter C as much as possible. By extension, in order to improve mounting quality of electrical components, the frame of a substrate A for liquid crystal display must be cleaned to the closest extent possible to the color filter C with a high accuracy of position.

However, as shown in FIG. 1, a conventional cleaning apparatus determines the positional relationship between the substrate A and the cleaning head E by pressing three pins D that are mounted on the cleaning apparatus on the edge part of the glass substrate B. However, in the case where setting tolerance between the glass substrate B and the color filter C is great, in other words, an example case where the color filter C is displaced from the glass substrate B, that the positional relationship between the glass substrate B and the cleaning head E is determined does not mean that the positional relationship between the color filter C and the cleaning head E is completely determined. Thus, it is difficult to clean the edge part to the closest extent possible to the color filter C. It is possible to clean the edge part having a predetermined width in the glass substrate B. However, if a part of the color filter C is displaced to the edge part, the color filter C is damaged in the cleaning operation.

The present invention is conceived also in order to solve the above-described problem. The second object of the present invention is to provide (a) a substrate edge part cleaning apparatus that can clean the edge part of the glass substrate B to the closest extent to the color filter C even in the case where the color filter C is displaced from a right setting position on the glass substrate B and (b) a substrate edge part cleaning method.

BRIEF SUMMARY OF THE INVENTION

In order to achieve the above object, the substrate edge part cleaning apparatus, of the present invention, has a cleaning head which cleans by wiping an edge part of a substrate for display while moving rectilinearly, the apparatus includes a camera which captures images of the proximity of an edge of a color filter which is placed on the substrate, by moving together with the cleaning head.

In a first aspect of the present invention, it is preferable for the camera, in the substrate edge part cleaning apparatus, to obtain surface status information of the substrate part which has been cleaned, and the substrate edge part cleaning apparatus further includes a cleaning degree judgment unit which judges cleaning degree based on the surface status information.

This makes it possible to judge cleaning degree of the substrate surface. Thus it becomes possible to recognize time for exchanging a cloth for wiping and to improve yielding by detecting insufficient cleaning.

Also, in the first aspect of the present invention, the substrate edge part cleaning apparatus may further include: an edge detection unit which detects the edge position of the color filter placed on the substrate based on the surface status information obtained by the camera; a substrate position recognition unit which recognizes the positional relationship between the edge of the color filter and the cleaning head based on the position information detected by the edge detection unit; and a substrate holding unit which adjusts a substrate position based on the positional relationship information recognized by the substrate position recognition unit.

This makes it possible to adjust the substrate position by directly recognizing the positional relationship between the edge of the color filter and the cleaning head. Therefore, it becomes possible to clean the substrate to the closest extent possible to the color filter C.

In a third aspect of the present invention, it is preferable that the substrate edge part cleaning apparatus further includes cameras placed forward and backward in a cleaning direction of the cleaning head, and in the apparatus, the before-cleaning information storing unit stores the surface status information obtained by the camera placed forward in the cleaning direction, the after-cleaning information storing unit stores the surface status information obtained by the camera placed backward in the cleaning direction, and the cleaning degree judgment unit judges cleaning degree step by step while cleaning operation of the cleaning head is ongoing.

This makes it possible to check, step by step, the cleaning degree of the substrate surface during the cleaning operation. Therefore, it becomes possible to recognize the occurrence of insufficient cleaning in real time, and thus it becomes possible to cope with the insufficient cleaning without badly affecting the following process.

Also, in order to achieve the above object, the substrate edge cleaning method, of the present invention, is applied for a substrate edge part cleaning apparatus having: a substrate holding unit which holds a substrate for display; a cleaning head which cleans by wiping an edge part of the substrate while moving rectilinearly; and a camera which moves together with the cleaning head and captures images of the proximity of an edge of a color filter which is placed on the substrate, and in the method, the camera obtains surface status information of a substrate part which has been cleaned, and the substrate edge part cleaning method further includes judging cleaning degree based on the surface status information.

This makes it possible to judge cleaning degree of the substrate surface in addition to adjusting of the substrate position. Thus it becomes possible to recognize time for exchanging the cloth for wiping and to improve the yielding by detecting insufficient cleaning.

Also, in order to achieve the above object, the substrate edge cleaning method, of the present invention, may be applied for a substrate edge part cleaning apparatus having: a substrate holding unit which holds a substrate for display; a cleaning head which cleans by wiping an edge part of the substrate while moving rectilinearly; and a camera which moves together with the cleaning head and captures images of the proximity of an edge of a color filter which is placed on the substrate. The method including: detecting the edge position of the color filter placed on the substrate based on the surface status information obtained by the camera; recognizing the positional relationship between the edge of the color filter and the cleaning head based on the positional relationship information; and adjusting the substrate position by driving the substrate holding unit to adjust the substrate position based on the position information obtained in said recognizing.

This makes it possible to adjust the substrate position by directly recognizing the positional relationship between the color filter edge and the cleaning head. Therefore, it becomes possible to clean the edge part of the substrate for liquid crystal display to the closest extent possible to the color filter C.

The present invention enables to clean a substrate to the closest extent possible to the color filter by causing a camera to recognize the position of a color filter edge.

Also, it becomes possible to detect insufficient cleaning for each substrate by judging the cleaning degree.

FURTHER INFORMATION ABOUT TECHNICAL BACKGROUND TO THIS APPLICATION

The disclosure of Japanese Patent Application No. 2004-257553 filed on Sep. 3, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION

First Embodiment

Next, the embodiment of the present invention will be described with reference to figures.

Figure 2:
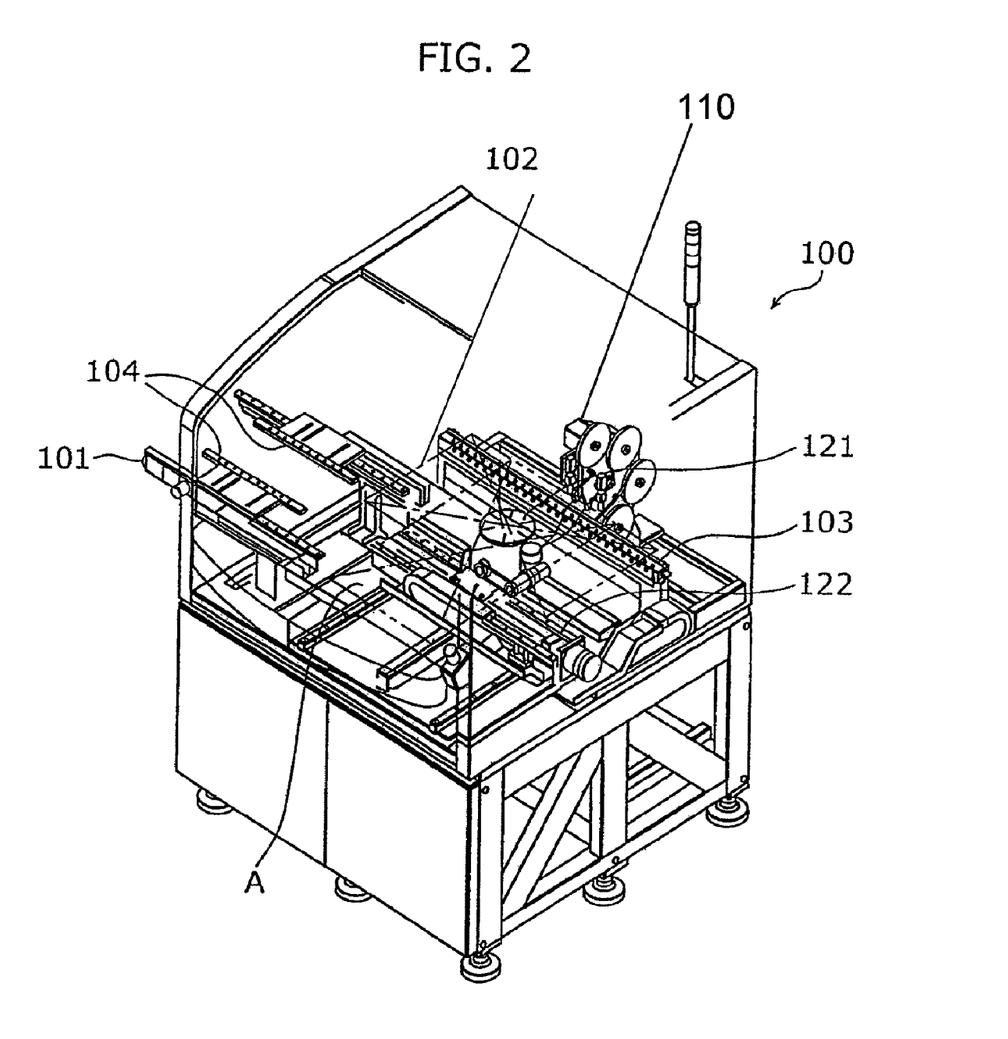
FIG. 2 is a partly perspective view showing a substrate edge part cleaning apparatus concerning the embodiment of the present invention.

FIG. 2 is a partly perspective view showing a substrate edge part cleaning apparatus 100 concerning the embodiment of the present invention.

Figure 7:
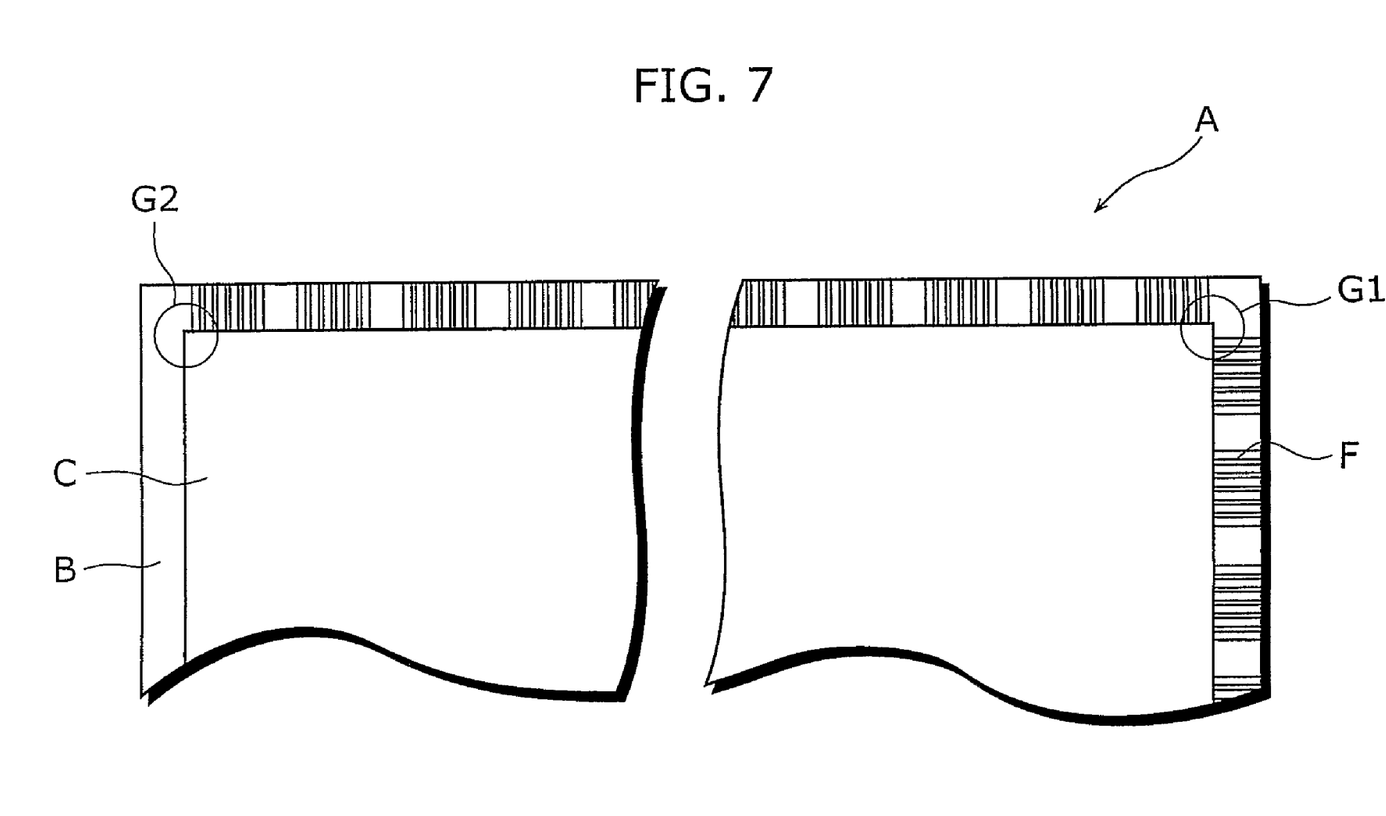
FIG. 7 is a plan view showing a part of the substrate for liquid crystal display to be cleaned.

As shown in FIG. 2, the substrate edge part cleaning apparatus 100 cleans the edge part of the substrate for liquid crystal display (LCD) shown in FIG. 7 by wiping a tape-shaped cloth, the edge part being for mounting terminals F for connecting electrical components. The substrate edge part cleaning apparatus includes: a loader 101; a substrate holding unit 102; a backup 103; and a cleaning head 110.

The loader 101 is for carrying a substrate for LCD into a substrate edge part cleaning apparatus 100. The loader 101 can mount the substrate A for LCD onto a slider 104 from outside the substrate edge part cleaning apparatus 100 and passes it to the substrate holding unit 102 by sliding the slider 104.

The substrate holding unit 102 can carry the held substrate A to a cleaning position, pass the substrate A to an unloader (not shown), and adjust the position of the substrate A to the cleaning head 110 in the cleaning position. The substrate holding unit 102 includes: a panel stage 121 that is a substrate holding means capable of rotating the held substrate A horizontally; and an XY table 122 capable of moving this panel stage 121 to the horizontal direction.

The backup 103 is a device to hold from below the whole edge part of the substrate A placed at a cleaning position. On the backup 103 flexible accordion pads 105 that are connected to a vacuum pump are set in the longitudinal direction at equal intervals. These accordion pads 105 play a role to aspirate the substrate A mounted on the backup 103 by vacuum aspiration, draw the edge part of the substrate A to the backup 103, and bond the edge part of the substrate A to the surface of the backup 103. This backup 103 having these accordion pads 105 holds the substrate A during the cleaning operation in which the substrate A is cleaned by wiping with a cloth. Thus, it is possible to prevent the color filter C from moving, resulting in consequential damage to the color filter C. Also, it is possible to prevent the edge part of the substrate from being insufficiently cleaned.

Further, the backup 103 can also correct surges by drawing the edge part of the substrate A to the surface of the backup 103, in other words, by aspirating the edge part of the substrate A using the accordion pads 105. In the case where the substrate A is big, such surges in the edge part of the substrate A are big accordingly. These surges may become a cause of insufficient cleaning. Thus, cleaning efficiency can be improved by the backup 103 especially in the above case.

Figure 3:
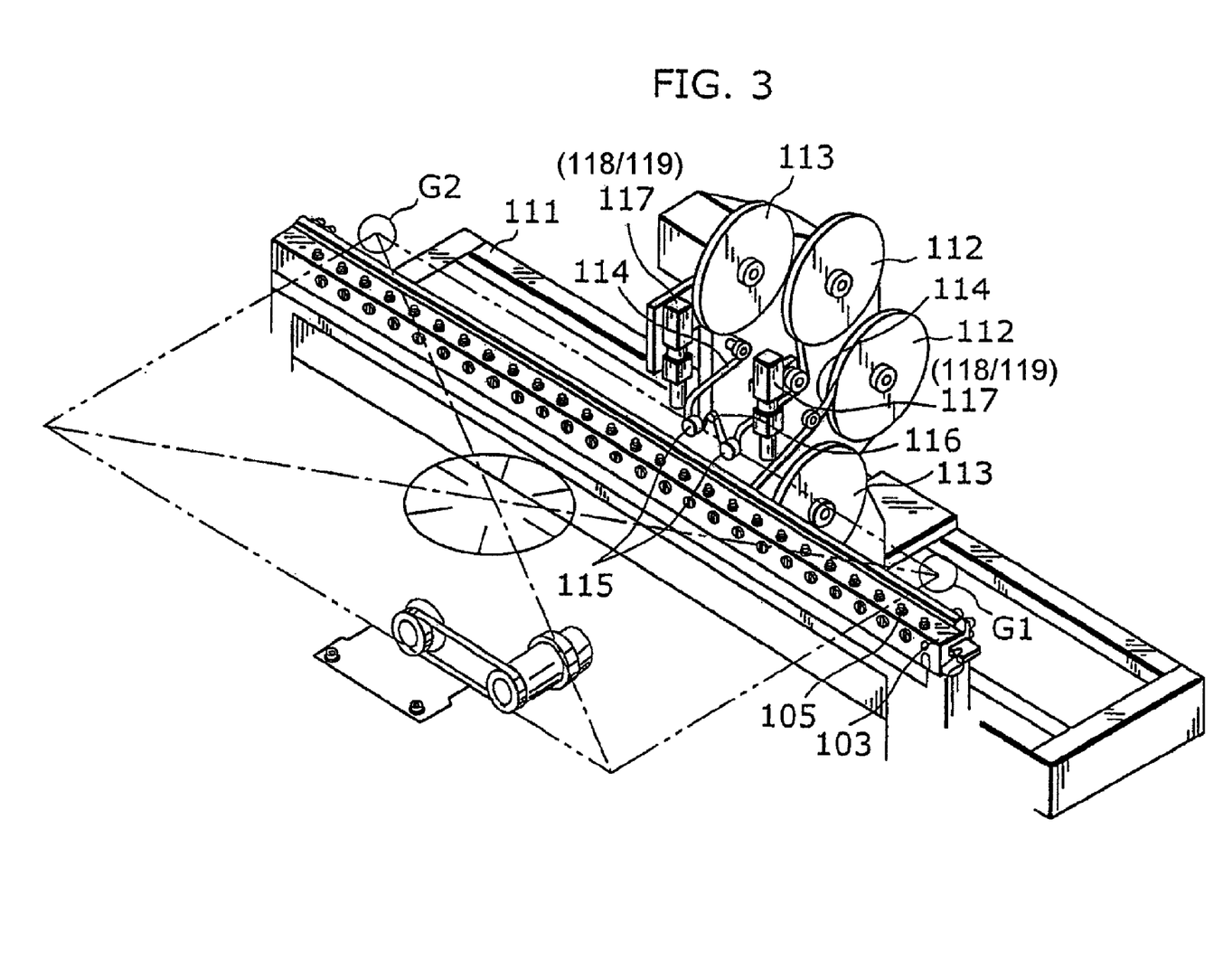
FIG. 3 is an enlarged perspective view showing the part that contributes to the cleaning performed by the substrate edge part cleaning apparatus.

FIG. 3 is an enlarged perspective view showing the part that contributes to the cleaning performed by the substrate edge part cleaning apparatus 100.

As shown in the figure, the cleaning head 110 cleans by wiping the edge part of the substrate while moving on a predetermined straight line to the body of the substrate edge part cleaning apparatus 100. The cleaning head 110 is set on the rail 111 that is placed in parallel to the backup 103 so that it can slide freely. This cleaning head 110 includes: a supply reel 112 for supplying tape-shaped cloth 114 for wiping; a collection reel 113 for rolling up the used portion of the tape-shaped cloth 114; a pressing roller 115 for pressing the tape-shaped cloth 114 supplied from the supply reel 112, on the edge part of the substrate A; and an adjustment roller 116 for making the connection between the cloth 114 and the substrate A into line-contact by adjusting the tension of the tape-shaped cloth 114. Further, the cleaning head 110 includes the same set of rollers on the back surface of the substrate A in order to clean the back of the substrate, the rollers being a supply reel 112, a collection reel 113, a pressing roller 115 and an adjustment roller 116.

The pressing roller 115 is attachable/detachable to the substrate A. It can slide the cleaning head 110 without wiping the substrate A with a cloth 114 when the pressing roller 115 is held while detached from the substrate A.

Also, cameras 117 are respectively placed forward and backward in the cleaning direction of the cleaning head 110. These cameras 117 captures images of the edge part of the substrate A, in other words, the proximity of the edge of the color filter C placed on the substrate A. These cameras 117 can move accordingly to the cleaning head 110, recognize the edge of the color filter C mounted on the surface of the substrate A and also recognize the edge part of the substrate A including terminals F mounted on the glass substrate B.

Note that the cleaning head 110 includes two cameras 117 that are placed side by side in the moving direction of the cleaning head 110. Among these two cameras 117, relative to the moving direction of the cleaning head 110, a camera 117 placed forward in the moving direction of the cleaning head 110 functions as a forward camera 118 and a camera 117 placed backward in the direction functions as a backward camera 119. In other words, which camera 117, a forward camera 118 or a backward camera 119, functions is dependent on the moving direction of the cleaning head 110. Thus, each camera can be a forward camera 118 and a backward camera 119, depending on the moving direction of the cleaning head 110.

Figure 4:
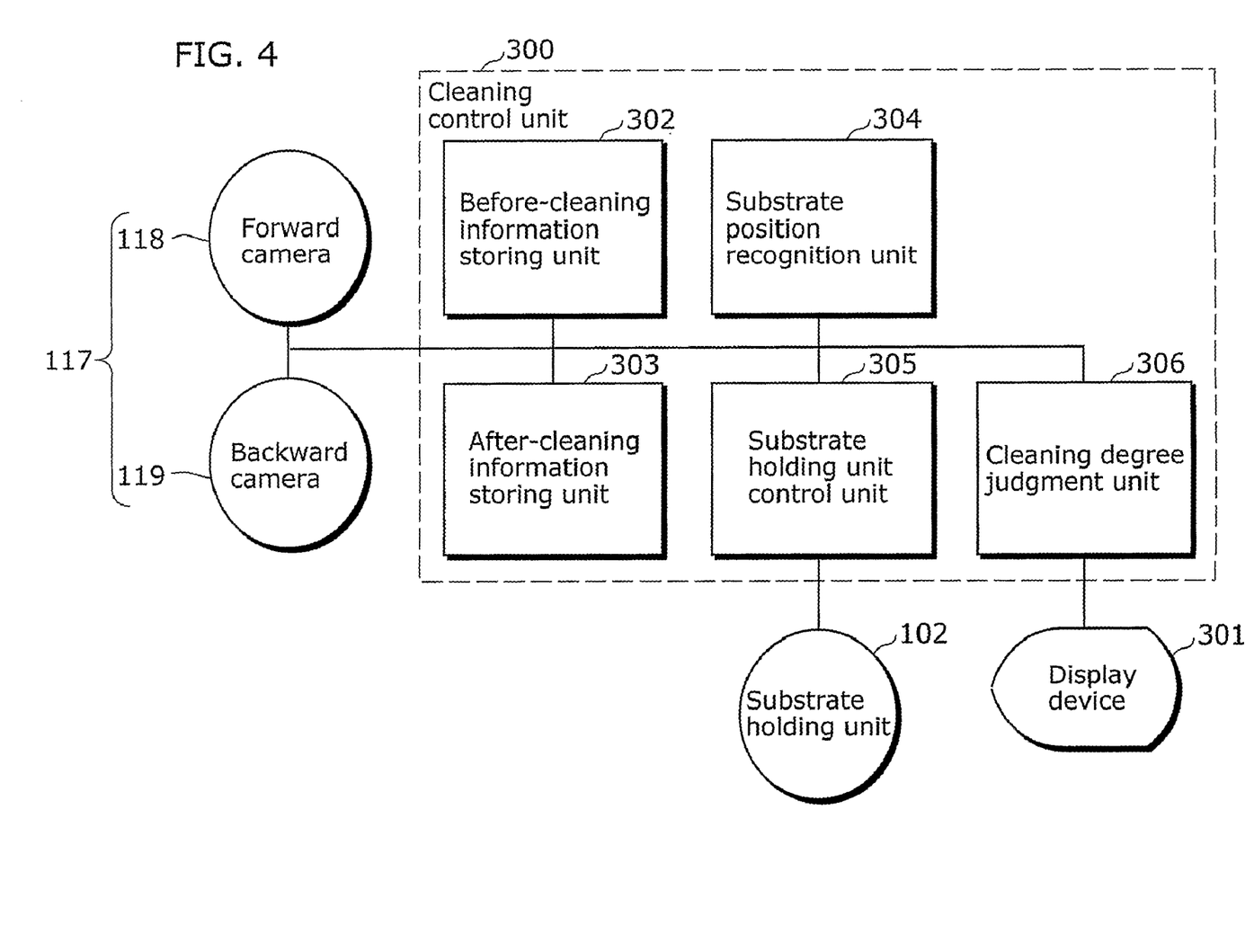
FIG. 4 is a block diagram showing a cleaning control unit that controls the substrate edge part cleaning apparatus during the cleaning operation.

FIG. 4 is a block diagram showing a cleaning control unit 300 that controls the substrate edge part cleaning apparatus 100 during the cleaning operation.

The cleaning control unit 300 shown in FIG. 4 is a processing unit that is embedded into the substrate edge part cleaning apparatus 100. The cleaning control unit 300 is connected to the following: cameras 117 (including forward camera 118 and backward camera 119, relative to the moving direction) that are set at the cleaning head 110; a substrate holding unit 102 capable of adjusting the position of the substrate A to the cleaning head 110; a display device 301 capable of displaying various kinds of information such as the information of cleaning degree.

Also, the cleaning control unit 300 includes: a before-cleaning information storing unit 302; an after-cleaning information storing unit 303; a substrate position recognition unit 304; a substrate holding unit control unit 305; and a cleaning degree judgment unit 306.

The display device 301 is, for example, a liquid crystal monitor capable of displaying judgment made by the cleaning degree judgment unit 306.

The before-cleaning information storing unit 302 stores image information of the before-cleaning surface in the edge part of the substrate A, the image being captured by the forward camera 118.

Likewise, the after-cleaning information storing unit 303 stores image information of the after-cleaning surface in the edge part of the substrate A (e.g., image information regarding the color filter C and the edge of the color filter), the image being captured by the backward camera 119.

The substrate position recognition unit 304 recognizes the position of the color filter C to the cleaning head 110 based on the position (image) information from the forward camera 118 and the position information of the edge (and cameras) of the color filter C that is obtained by analyzing the image information of the edge of the color filter C, the image being captured by the forward camera 118. The substrate position recognition unit 304 can recognize the edge line that connects two corners of the color filter C and recognize the positional relationship between the line and the line of moving trajectory of the cleaning head 110. In other words, the substrate position recognition unit 304 can recognize (a) whether or not the edge line that connects two corners of the color filter C is in parallel with the line of moving trajectory of the cleaning head 110 and (b) the angle formed by these two lines in the case where these lines are not parallel to each other. Further, the substrate position recognition unit 304 recognizes the distance between the edge part of the cleaning head 110 and the edge line that connects two corners of the color filter C.

The substrate holding unit control unit 305 controls the substrate holding unit 102 so that the positional relationship between the cleaning head 110 and the color filter C falls within a predetermined range based on the substrate position information recognized by the substrate position recognition unit 304. More specifically, in this embodiment, the substrate holding unit control unit 305 drives the panel stage 121 that holds the substrate A in a way that the edge line of moving trajectory of the cleaning head 110 becomes in parallel with the edge line that connects two corners of the color filter C. After that, as shown in FIG. 7, the substrate holding unit control unit 305 drives the XY table 122 in a way that the distance t between the end of the tape-shaped cloth for wiping 114 and the end of the color filter C becomes 0.3 mm.

The cleaning degree judgment unit 306 judges cleaning degree by analyzing image information. The cleaning degree judgment unit 306 calculates the share of particles before cleaning and the share of particles after cleaning based on the image information of the before and after cleaning surface statuses of the edge part of the substrate A, and then compares the shares of particles such as dust based on the image information, the before-cleaning information being stored in the before-cleaning information storing unit 302 and the after-cleaning information being stored in the after-cleaning information storing unit 303. In the case where the cleaning degree judgment unit 306 judges that the share of particles after cleaning does not decrease to a predetermined value or below, it causes the display device 301 to display a warning.

A concrete example of calculating shares of particles will be described below.

Figure 9:
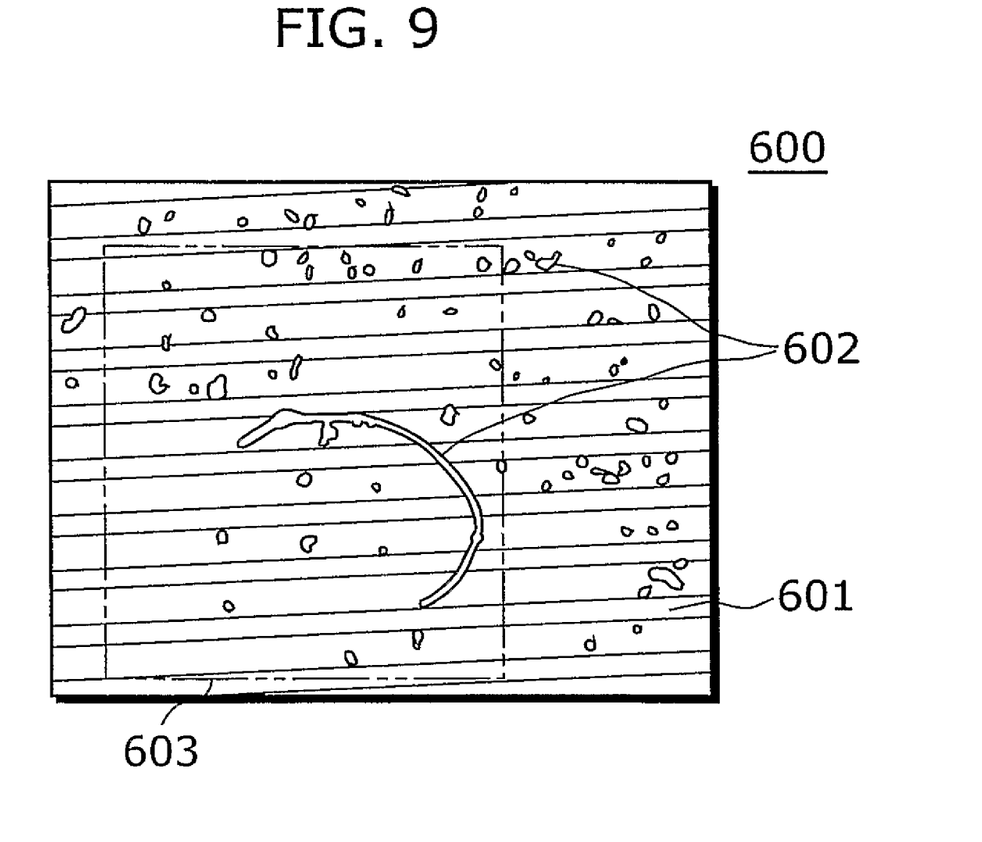
FIG. 9 is a diagram that visualizes image information of the substrate edge part.

The image information of the surface status to be stored in the after-cleaning information storing unit 303 is visualized like FIG. 9. FIG. 9 provides image information 600 that enables recognizing particles 602 on the cleaning area 601 that is the edge part of the substrate A. After that, the cleaning degree judgment unit 306 specifies a visual field 603 based on this image information and judges the cleaning degree of this visual field 603. In other words, the cleaning degree judgment unit 306 performs a binarize process of the cleaning area 601 and the particles 602 in the visual field 603, and calculates the total area size of the particles 602 by extracting the particles 602 on the surface of the substrate A according to the binarized image information.

Likewise, the total area size of the particles 602 is calculated based on the image information of the surface status stored in the before-cleaning information storing unit 302.

After that, in the case where the calculated total area size of the particles 602 after cleaning does not decrease to, for example, 50 percent or below of the total area size of the particles before cleaning, a warning is displayed.

Also, in the case where the maximum size of the particles 602 after cleaning is, for example, not less than 10 to 20 micron or not less than the interval between lead wires on the substrate, a warning may be displayed.

Next, operations of the substrate edge part cleaning apparatus 100 will be described with reference to figures.

Figure 5:
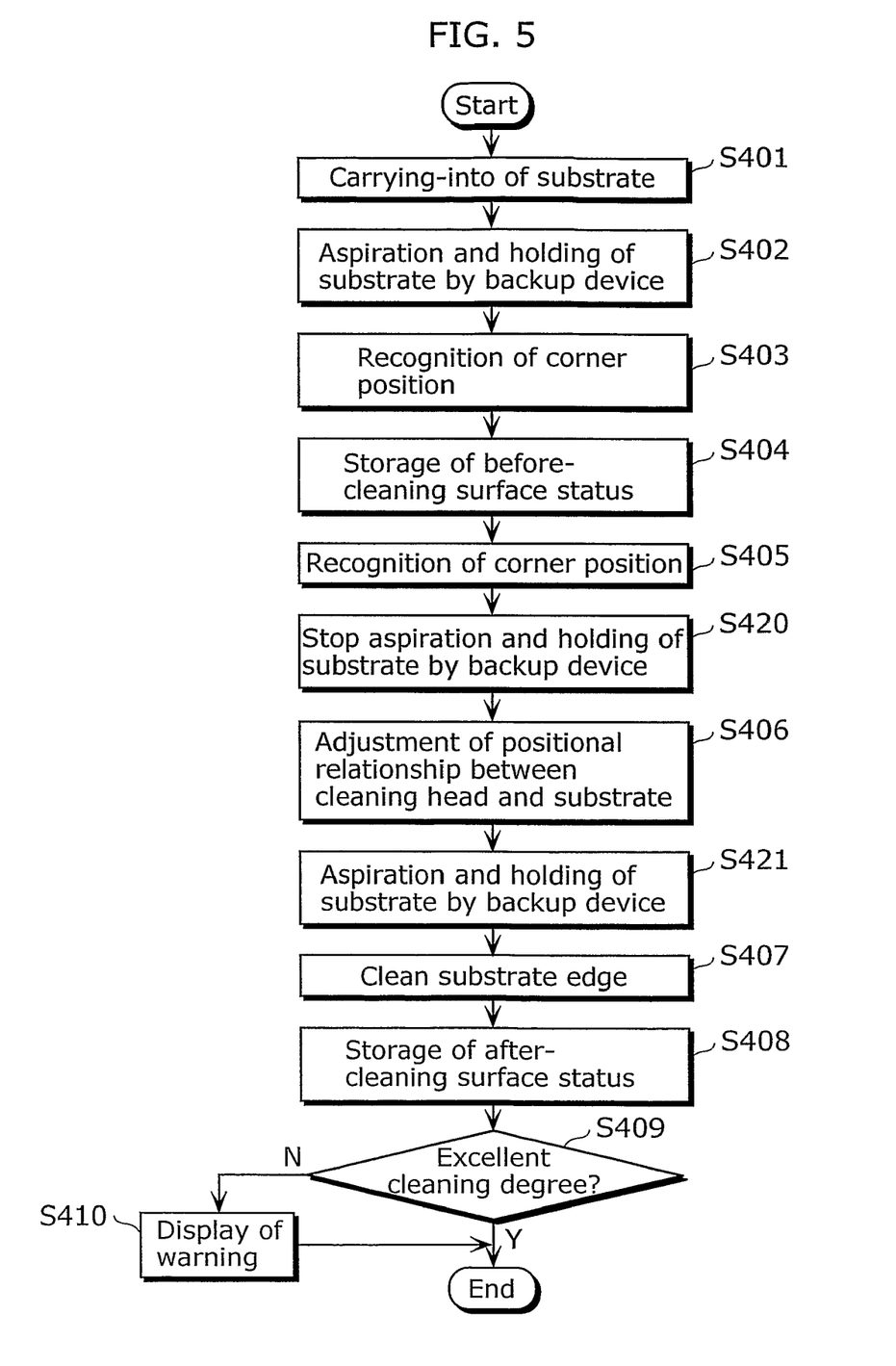
FIG. 5 is a flow chart showing the cleaning operation of the substrate edge part cleaning apparatus.

FIG. 5 is a flow chart showing cleaning operations of the substrate edge part cleaning apparatus 100.

The substrate edge part cleaning apparatus 100 receives, using the loader 101, the substrate A carried from the upstream in the process of mounting electrical components onto the LCD substrate. After that, the loader 101 mounts the substrate A on the panel stage 121 of the substrate holding unit 102 that has been moved to the position to be received. After receiving the substrate A, the substrate holding unit 102 carries the substrate A into the position where the substrate A is cleaned (Step 401).

Next, the edge part of the substrate A is mounted on the backup 103, and the backup 103 vacuum-aspirates the proximity of the edge part of the substrate A using the accordion pads 105. In this way, the substrate A is steadily held while correcting surges in the edge part of the substrate A (Step 402).

Next, the substrate edge part cleaning apparatus 100 recognizes the corner G1 of the color filter C mounted on the substrate A using the forward camera 118 in a state where the pressing roller 115 of the cleaning head 110 is detached from the substrate A, in other words, in a state where the tape-shaped cloth 114 does not wipe the substrate A. After that, the substrate position recognition unit 304 analyzes the image information and recognizes the absolute position of the corner G1 (the position to the body of the substrate edge part cleaning apparatus 100) (Step 403).

Next, the substrate edge part cleaning apparatus 100 slides the cleaning head 110 in a state where the tape-shaped cloth 114 does not wipe the substrate A like the above case, recognize the surface status of the edge part of the substrate A using the forward camera 118 and then causes the before-cleaning information storing unit 302 to store the before-cleaning surface status (Step 404).

Next, when reaching the corner G2 of the substrate A, the forward camera 118 recognizes the corner G2 of the color filter C. After that, like the earlier-described case, the substrate position recognition unit 304 analyzes the image information and recognizes the absolute position of the corner G2 (the position to the body of the substrate edge part cleaning apparatus 100) (Step 405).

Figure 8:
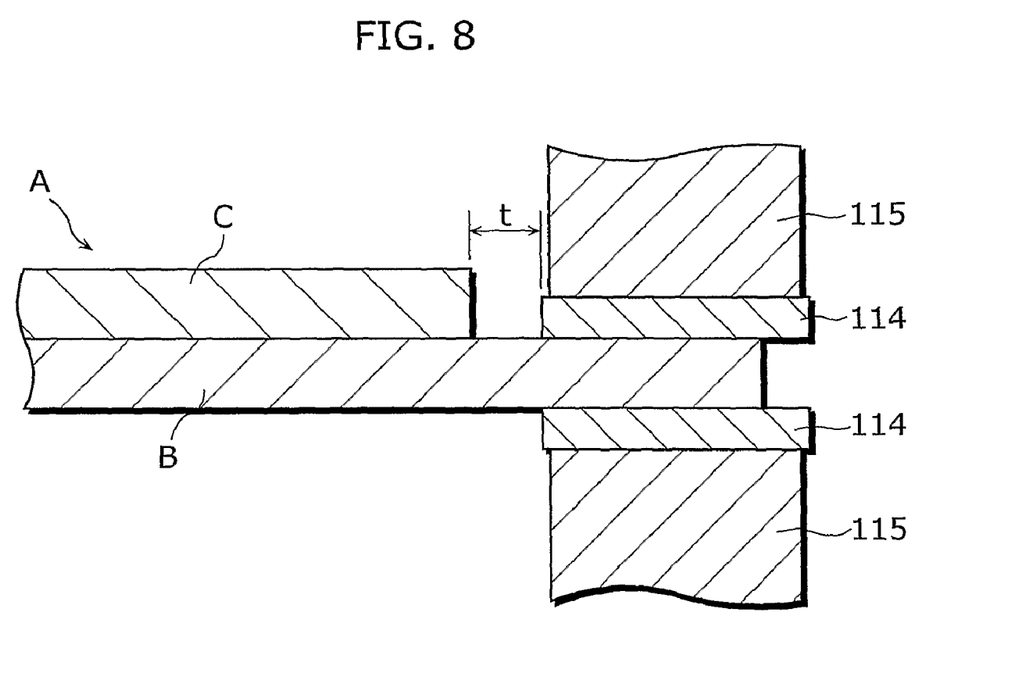
FIG. 8 is a plan view showing the status where a conventional substrate for liquid crystal display is placed at a predetermined position.

Next, the substrate position recognition unit 304 calculates the relation between (a) the edge line which is obtained by connecting these two corners G1 and G2 to each other and indicates the edge of the color filter and (b) the moving trajectory of the cleaning head 110 (straight line). In order to adjust the position of the substrate A, the substrate edge part cleaning apparatus 100 causes the backup 103 to stop aspiration (Step 420), and then the substrate holding control unit 305 drives the panel stage 121 so that both the straight lines become parallel to each other based on the calculated relationship. After that, as shown in FIG. 8, the substrate holding unit control unit 305 drives the XY table 122 so that the distance t between the edge of the tape-shaped cloth 114 and the edge of the color filter C becomes 0.3 mm, and then adjusts the positional relationship between the substrate A and the cleaning head 110 (Step 406).

When the adjustment is completed, the substrate edge part cleaning apparatus 100 causes the backup 103 to aspirate and hold (Step 421) the substrate again, makes the pressing roller 115 of the cleaning head 110 closer to the substrate A so as to make the tape-shaped cloth 114 touch the area to be wiped of the substrate A, and cleans the edge part of the substrate A by sliding the cleaning head 110 (Step 407).

Also, the substrate edge part cleaning apparatus 100 recognizes the surface status of the substrate A after cleaning using the backward camera 119 mounted backward in the cleaning direction, and causes the after-cleaning information storing unit 303 to record the surface status after cleaning (Step 408).

After the cleaning operation of a side of the substrate A is completed, the cleaning degree judgment unit 306 calculates the share of the particles such as dust by analyzing the image information of the surface of the edge part of the substrate, the image information being stored in the before-cleaning information storing unit 302. Likewise, the cleaning degree judgment unit 306 calculates the share of the particles obtained from the image information of the same area of the edge part of the substrate, the image information being stored in the after-cleaning information storing unit 303 so as to compare the result with the earlier-obtained result. In the case where the cleaning degree judgment unit 306 judges that the share of the particles does not decrease to a threshold or below, in other words, the cleaning degree is not good (Step 409: N), it causes the display device 301 to display a warning (Step 410).

On the other hand, in the case where the cleaning judgment unit 306 judges that the cleaning degree is good (Step 409: Y), it regards that the cleaning operation of the side of the substrate A is completed. After that, the substrate A is rotated by 90 degrees in order to clean another side of the substrate A or else, the next substrate is carried into.

As described up to this point, the substrate edge part cleaning apparatus 100 concerning this embodiment can adjust the position of the substrate A after correctly recognizing the positional relationship between the edge of the color filter and the cleaning head 110 using the camera 117. Therefore, the substrate edge part cleaning apparatus 100 can correctly place the tape-shaped cloth 114 immediately before the edge of the color filter C irrespective of the setting tolerance of the color filter C and the substrate A, and thus it can perform wiping operation maintaining the distance between the cleaning head 110 and the color filter C.

Further, the cameras for position recognition are also utilized as the cameras for cleaning degree judgment. This makes it possible to lower the cost of the substrate edge part cleaning apparatus because it is possible to reduce the number of components to be attached to the cleaning head 110 that moves frequently. Also, it becomes possible to reduce the tact time for cleaning by simplifying the cleaning process.

The embodiment has described the case where cleaning degrees are judged by comparing a before-cleaning surface status with an after-cleaning surface status, but it should be noted that how to judge cleaning degree in the present invention is not limited to the described method.

For example, cleaning degree may be judged in the following way: only the after-cleaning surface status of the substrate A is recognized, the images of particles are extracted from the surface image, the size of the particles or the share of the particles are calculated, and then cleaning degree is judged based on the calculated value.

This method is suitable for the case where cleaning degree is evaluated based on an absolute standard.

Second Embodiment

Next, another embodiment of the present invention will be described below with reference to figures. Note that the structure of the apparatus in this embodiment is the same as the earlier embodiment and thus its description will be omitted here.

Figure 6:
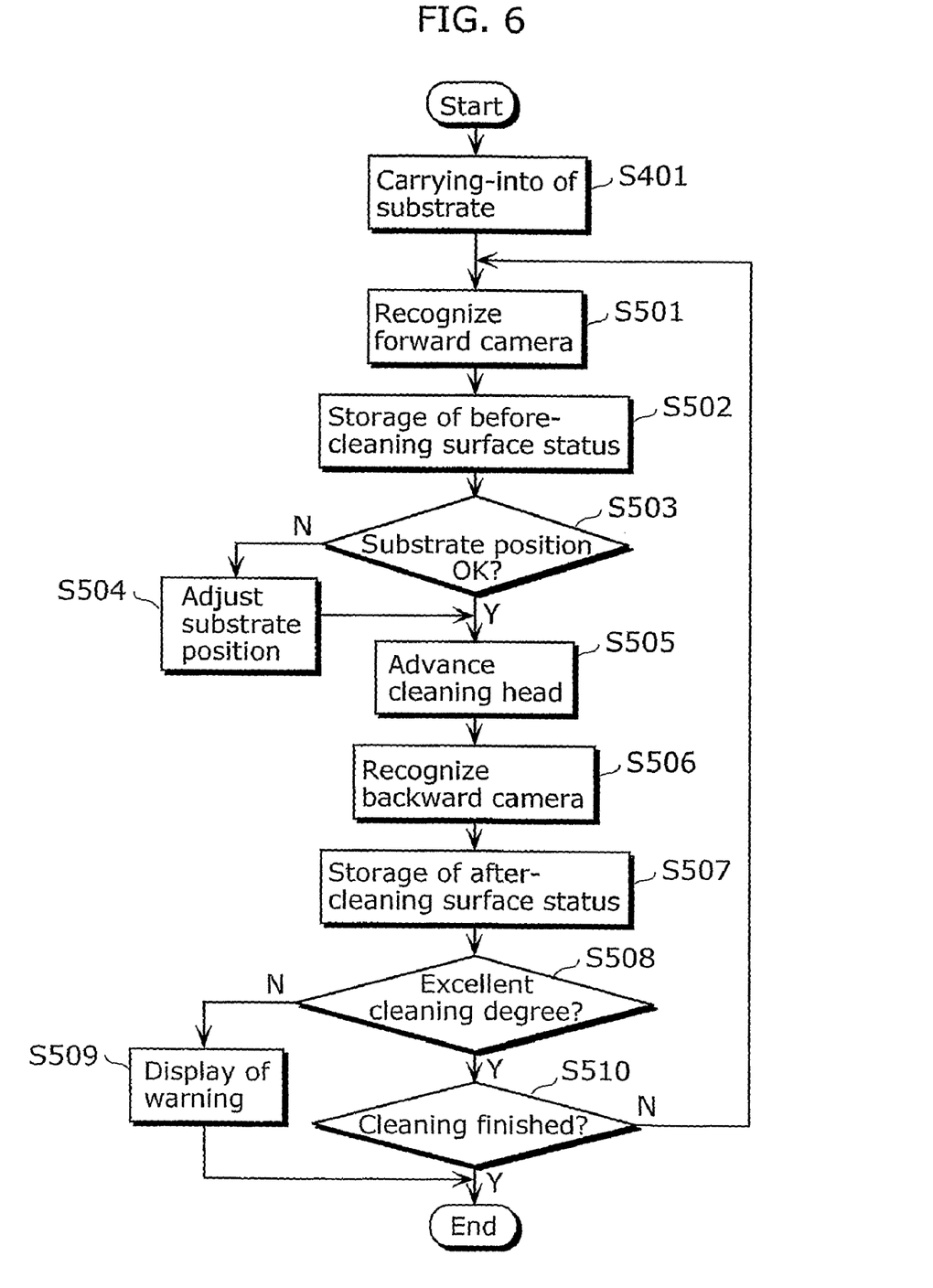
FIG. 6 is a flow chart showing the operation of the substrate edge part cleaning apparatus concerning another embodiment of the present invention.

FIG. 6 is a flow chart showing the operations of the substrate edge part cleaning apparatus 100 in this embodiment.

As for carrying-in operation of the substrate A (Step 401) is the same as the one in the earlier embodiment.

Next, the substrate edge part cleaning apparatus recognizes the area with which cleaning operation is started using the forward camera 118 mounted forward in the cleaning direction of the cleaning head 110, the area being the corner G of the substrate A (Step 501).

Also, the image of the surface that is yet to be cleaned of the substrate A is captured by the forward camera 118 and the resulting image information is stored in the before-cleaning information storing unit 302 (Step 502).

After the corner G is recognized by the forward camera 118, the substrate position recognition unit 304 recognizes the distance between the edge of the color filter C and the cleaning head 110 by analyzing the image information. In the case where the distance between the color filter C and the cleaning head 110 does not fall within a predetermined distance range (Step 503: N), the substrate position recognition unit 304 controls the substrate holding unit 102 so that the distance is adjusted to a value which falls within the predetermined distance range using the substrate holding unit control unit 305 (Step 504).

Next, the edge part of the substrate A is wiped by causing the cleaning head 110 to proceed to the cleaning direction (Step 505).

Next, the cleaned area in the substrate A is recognized by the forward camera 119 mounted backward in the cleaning direction of the cleaning head 110 (Step 506). After that the image information of the cleaned area of the substrate A is stored in the after-cleaning information storing unit 303 (Step 507).

Next, the cleaning degree judgment unit 306 analyzes the image information of the before-cleaning part and the image information of the after-cleaning part on the surface, calculates the share of particles of each part, and then compares both shares. In the case where the cleaning degree judgment unit 306 judges that cleaning degree is not good (Step 508: N), it causes the display apparatus 301 to display the fact (Step 509) and then completes the cleaning.

On the other hand, in the case where the cleaning degree judgment unit 306 judges that cleaning degree is good (Step 508: Y), it continues the cleaning operation by repeating from the recognition by the forward camera 118 (Step 501) to the judgment of cleaning degree (Step 508).

When the cleaning head 110 reaches the cleaning end position (Step 510: Y), it completes the cleaning operation.

As described up to this point, the substrate edge part cleaning apparatus 100 can adjust, step by step, the position of the cleaning head 110 to the substrate A as the wiping operation proceeds. This enables eliminating the operation of recognizing the position of the substrate A previously, resulting in improving the tact time for cleaning operation. Also, since cameras are placed forward and backward in the cleaning direction, it becomes possible to judge cleaning degree as the cleaning operation proceeds. This enables early detection of insufficient cleaning even during the cleaning operation, and thus waste in the operation can be eliminated.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be applied for a cleaning apparatus that cleans the edge part of a substrate for liquid crystal display by wiping, especially for a cleaning apparatus and the like to be embedded into a substrate for liquid crystal display as one of lines in an electric component mounting process.

The invention claimed is:

1. A substrate edge part cleaning apparatus comprising:
    a cleaning head configured to clean an edge part of a substrate for display by wiping the edge part of the substrate while moving rectilinearly;
    a camera configured to move together with said cleaning head, configured to capture an image of a proximity of an edge of a color filter placed on the substrate, and configured to obtain surface status information of the substrate;
    an edge detection unit configured to detect a position of two corners of the edge of the color filter, based on the surface status information obtained by said camera;
    a substrate position recognition unit configured to derive position information of a whole edge of the color filter from the detected position of the two corners of the color filter, and configured to recognize a positional relationship between the edge of the color filter and a location of said cleaning head; and a substrate holding unit configured to adjust a position of the substrate based on (a) the derived position information of the whole edge of the color filter, and (b) the positional relationship between the edge of the color filter and the location of said cleaning head.

2. A substrate edge part cleaning method performed by a substrate edge part cleaning apparatus including a substrate holding unit, which holds a substrate for display, a cleaning head, which cleans an edge part of the substrate by wiping the edge part of the substrate while moving rectilinearly, and a camera, which moves together with the cleaning head, captures an image of a proximity of the edge of a color filter placed on the substrate, and obtains surface status information of the substrate, said substrate edge part cleaning method comprising:

detecting a position of the edge of the color filter based on the surface status information obtained by the camera;

detecting a position of two corners of the color filter by moving the cleaning head rectilinearly without performing a cleaning operation;

recognizing position information of a whole edge of the color filter;

recognizing a positional relationship between the edge of the color filter and a location of the cleaning head based on the detected position of the edge of the color filter; and  adjusting a position of the substrate by causing the substrate holding unit to adjust the position of the substrate based on (a) the recognized position information of the whole edge of the color filter and (b) the recognized positional relationship between the edge of the color filter and the location of the cleaning head.

* * * * *